T. H. COGSWELL, B. JAHN & E. E. KAHL.
VALVE GRINDER.
APPLICATION FILED DEC. 12, 1916.
1,237,751.
Patented Aug. 21, 1917.
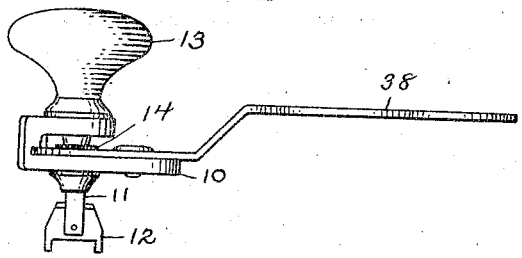
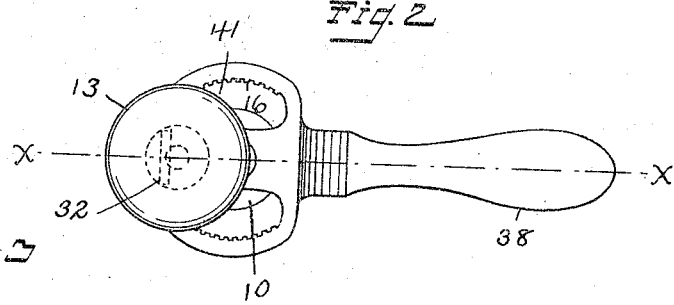
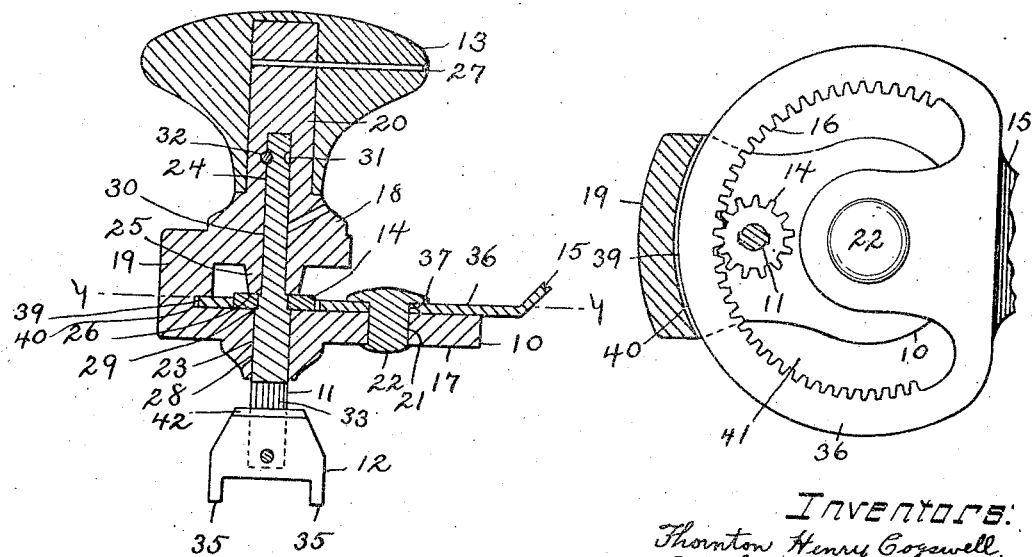
Inventors:
Thornton Henry Cogswell.
Berthold Jahn.
Ernest Emil Kahl.
By Louis M. Schmidt
Atty.

UNITED STATES PATENT OFFICE.

THORNTON H. COGSWELL, OF NEWINGTON, AND BERTHOLD JAHN AND ERNEST E. KAHL, OF NEW BRITAIN, CONNECTICUT.

VALVE-GRINDER.

1,237,751.  Specification of Letters Patent.  Patented Aug. 21, 1917.

Application filed December 12, 1916. Serial No. 136,527.

*To all whom it may concern:*

Be it known that we, THORNTON HENRY COGSWELL, a citizen of the United States, residing at Newington, and BERTHOLD JAHN and ERNEST EMIL KAHL, citizens of the United States, residing at New Britain, in the county of Hartford and State of Connecticut, have invented certain new and useful Improvements in Valve-Grinders, of which the following is a specification.

Our invention relates to improvements in valve-grinders, and the object of our improvement is simplicity and economy in construction and convenience and efficiency in use.

In the accompanying drawing:—

Figure 1 is a side elevation of our improved valve-grinder.

Fig. 2 is a plan view of the same.

Fig. 3 is a sectional view on an enlarged scale, on the line $x\ x$ of Fig. 2.

Fig. 4 is a sectional view on the line $y\ y$ of Fig. 3.

Our improved valve-grinder comprises a frame 10, a spindle 11 extending through the same, having valve engaging mechanism 12 at the lower end and a handle 13 at the upper end, and devices for rotating the said spindle 11 comprising a gear 14 mounted on the said spindle 11 and positioned in the frame 10 and a lever 15 pivotally mounted on the frame 10 and having a sector-rack 16 for coöperating with the said gear 14.

The frame 10 is generally U-shaped, comprising the lower horizontal arm 17, the upper arm 18 positioned in spaced relation above the lower arm 17 and a yoke 19 connecting the said arms 17 and 18 at one end thereof, the upper arm 18 having an upwardly directed post 20.

The lower arm 17 has adjacent one end the hole 21 for the pivotal pin 22 that serves as the pivotal connection for the lever 15 and between the hole 21 and the yoke 19 there is a hole 23 that serves as a bearing for the shaft or spindle 11.

Above the hole 23 and in alinement therewith the upper arm 18 is provided with a bore 24 that extends for an appreciable distance along the length of the post 20 in which is housed the upper end of the shaft 11 and that serves as a bearing therefor.

As shown, the upper arm 18 has a downward extension 25 in the form of a boss, concentric with the spindle 11, the lower face 26 of which serves as a thrust bearing for the gear 14, and which is spaced from the lower arm 17 the proper distance for housing the said gear 14.

The handle 13 is of wood and is secured to the post 20 by the pin 27.

The lower portion 28 of the spindle 11 fits in the hole 23 in the lower arm 17 and flush with the upper face of the lower arm 17 is a shoulder 29 that bears against the gear 14, the upper portion 30 of the said spindle 11 above the said shoulder 29 being reduced in diameter.

Adjacent the extreme upper end of the spindle 11 is a circular groove 31 for a retaining pin 32 that holds the spindle 11 longitudinally in place in the frame and permits of relative rotative movement.

The lower end 33 of the spindle 11 is forked as shown and in the slot is positioned the valve engaging device 12, being held in position by a pivotal pin 34 that permits of turning the same in the slot.

The valve engaging device 12 is a plate-like structure, fitting in the slot in the forked lower end 33, and is provided on the one edge with a pair of prongs 35 in spaced relation for use with one kind of a valve suitably to engage with corresponding holes in the valve for effecting a rotative movement of the valve when the valve grinder is operated, and on the opposite edge with a screw driver blade 42 for use in other cases.

The tilting movement permitted by the structure described for mounting the valve engaging device 12 renders the said device self-adjusting for slight irregularities of alinement of the spindle 11 with the valve when the grinder is operated.

The lever 15 is formed of sheet material and comprises the body portion 36 that extends along the upper face of the lower arm 17, having a hole 27 for the pivotal pin or stud 22 and at inner end has the sector rack 16 and at the outer end a handle portion 38 that may be off-set as shown relatively to the body portion 36.

The sector rack 16 is in the form of an internal gear, the body portion 36 having an arc-shaped slot 41 in which the gear 14 travels, the rack 16 being on the side of the said gear 14 remote from the pivotal connection 22 for the lever 15.

As described the upper face of the lower arm 17 is in abutment with and serves as a bearing for the body portion 36 of the lever 15.

I provide a bearing housing for the inner end portion 39 of the body portion 36 by providing a transverse recess 40 in the yoke 19 that is an operative fit for the same as shown, the said bearing 40 serving in coöperation with the pivotal stud 22 to positively hold the lever 15 in operating position in parallel relation to the lower arm 17.

As described the inner end portion 39 of the operating lever is in the form of an arc-shaped strip that closes the outer side of the slot 41 in which the gear 14 travels, the edge opposed to the gear being provided with the rack 16 that coöperates with the said gear, and the edge portion remote from and directly opposite the gear 14 being operatively housed in the slit-like bearing 40 provided therefor in the frame 10. Thus tilting of the lever 15 by downward or lateral pressure on the handle 38 is prevented and the rack is at all times held in proper operative position relatively to the gear, notwithstanding the fact that the lever is made of sheet material that is of moderate thickness.

The construction described permits the rack to be made to extend over a relatively long arc as shown, so as to provide for several revolutions of the gear for a complete swinging movement of the lever handle. Thus a complete movement of the lever will effect about three revolutions of the shaft. This permits of effecting a complete rotary movement of the shaft such as is ordinarily desired for proper operation by a movement of the lever over only a part of the full possible movement.

Thus by providing an extra long rack a choice of position of the handle is provided for proper operation, so that the device may be satisfactorily operated in out of the way places and in cases where there may be obstructions that prevent the full movement. An important feature in effecting this result is the fact that the rack for operating the gear is in the form of an internal gear, whereby a definite angular movement of the handle effects a relatively greater rotary movement of the shaft.

We claim as our invention:—

1. A valve-grinder comprising a frame of generally U-shape, a shaft extending through the arms of the said frame, a gear mounted on the said shaft and positioned between the said arms, an operating lever pivotally mounted on the said frame and having a rack that is engaged with the said gear, valve engaging devices on one end of the said shaft, a handle on the said frame positioned in alinement with the said shaft, and the said arms being in bearing engagement with the opposed faces of the said gear.

2. A valve grinder comprising a frame, having a handle, a shaft housed in the said frame having a valve engaging device at one end, a gear mounted on the said shaft and positioned in the said frame, a lever pivotally mounted on the said frame and having a slot in which the said gear is positioned, one of the border walls of the said slot having a rack for engaging with the said gear, and the said frame having a sliding bearing for the free edge portion of the said lever.

3. In a valve grinder, a frame, a shaft mounted in the said frame and having a valve engaging device at one end, a gear mounted on the said shaft positioned in the said frame, a lever mounted on the said frame having a slot in which the said gear is positioned, the end portion of the said lever being in the form of an arc-shaped strip that closes one side of the said slot, the edge portion of the said strip that is opposed to the said gear being provided with a rack for engaging with the said gear, and the said frame having a slit that serves as a slide bearing for the edge portion of the said strip opposed to the said rack.

4. A valve-grinder comprising a frame, a shaft operatively mounted in the said frame, a gear mounted on the said shaft, a lever, a pivotal connection for the said lever and frame positioned to one side of the said shaft, the said lever having a slot concentric with the said pivotal connection in which the said gear travels, and the wall of the said slot remote from the said pivotal connection being provided with a rack for engaging with the said gear.

THORNTON H. COGSWELL.
BERTHOLD JAHN.
ERNEST E. KAHL.

Witnesses:
 HERBERT T. JAHN,
 WILLIAM MAIER.